United States Patent [19]

Elmendorp et al.

[11] 3,729,304

[45] Apr. 24, 1973

[54] PROCESS FOR THE PREPARATION OF OXIMES

[75] Inventors: Jan Elmendorp, Brunssum; Abraham H. De Rooij, Geleen, both of Netherlands

[73] Assignee: Stamicarbon, N.V., Heerlen, Netherlands

[22] Filed: June 15, 1971

[21] Appl. No.: 153,187

[30] Foreign Application Priority Data

June 17, 1970   Netherlands .......................7008838

[52] U.S. Cl. ..............................71/34, 71/35, 71/37, 260/566 A, 423/310, 423/313
[51] Int. Cl. ..............................................C05b 11/04
[58] Field of Search......................260/566 A; 71/37, 71/39, 41, 34–36; 423/310, 313

[56] References Cited

UNITED STATES PATENTS

| 3,600,154 | 8/1971 | Slot et al. | 71/37 |
| 3,667,904 | 6/1972 | Roche et al. | 71/39 |
| 3,342,580 | 9/1967 | Rooij | 71/39 |
| 3,641,150 | 2/1972 | Rooij | 260/566 A |
| 3,335,183 | 8/1967 | Rooij | 260/566 A |

FOREIGN PATENTS OR APPLICATIONS

| 1,496,435 | 9/1967 | France | 260/566 A |
| 1,073,248 | 6/1967 | Great Britain | 260/566 A |

*Primary Examiner*—Reuben Friedman
*Assistant Examiner*—Richard Barnes
*Attorney*—Cushman, Darby & Cushman

[57]   ABSTRACT

A process for synthesizing an oxime by reacting an organic carbonyl compound with a hydroxylammonium sulfate and ammonium hydrogen sulfate in the presence of ammonium dihydrogen phosphate whereby an aqueous solution of phosphoric acid and ammonium sulfate is obtained after separating the oxime product therefrom. The phosphoric acid, ammonium sulfate solution can be used in processing rock phosphate with the aid of nitric acid to product a fertilizer composition having a N to $P_2O_5$ ratio of approximately 1:1.

4 Claims, 2 Drawing Figures

PROCESS FOR THE PREPARATION OF OXIMES

The present invention relates to the preparation of oximes from the reaction of an organic compound containing a carbonyl group with a hydroxylamine solution wherein the hydroxylamine solution is obtained by reduction of a solution containing nitrite and bisulfite with sulfur dioxide followed by hydrolysis of the hydroxylamine disulfonate formed. In such process, an aqueous solution of ammonium nitrite and ammonium bisulfite is reacted with $SO_2$ forming ammonium salt of the hydroxylamine disulfonic acid according to the following reaction mechanism:

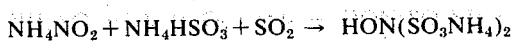

Sulfuric acid is then added to the resulting solution of the ammonium salt of hydroxylamine disulfonic acid to adjust the solution to a pH of approximately 2 whereupon the solution is heated and the hydroxylamine disulfonic ammonium salt is hydrolized to the hydroxyl ammonium-ammonium sulfate and ammonium hydrogen sulfate according to the following equations:

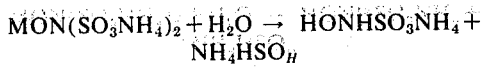

and

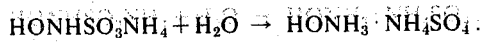

The ammonium hydrogen sulfate is normally neutrilized with $NH_3$ forming ammonium sulfate and the resulting ammonium sulfate, hydroxyl ammonium salt solution is used in the oxime synthesis reaction, in which the hydroxyl ammonium salt reacts with an organic compound containing a carbonyl group producing the oxime and ammonium hydrogen sulfate. The ammonium hydrogen sulfate is converted with $NH_3$ to ammonium sulfate. Thus, in preparing oxime in this manner, two moles of $NH_3$ are theoretically required for each mold of hydroxyl ammonium salt converted to the oxime in order to convert the ammonium hydrogen sulfate formed in the reaction mechanism into ammonium sulfate.

The formation of ammonium sulfate as a by-product using relative expensive $NH_3$ is commercially unattractive because ammonium sulfate, which is used as a nitrogenous fertilizer, is commercially overproduced and as a result of little commercial value. It would be advantageous to recover the ammonium hydrogen sulfate itself rather than convert it to ammonium sulfate. The ammonium hydrogen sulfate could then further be processed, utilizing the sulfuric acid content thereof in the decomposition of rock phosphate. It has been proposed to carry out the preparation of oxime in a moderately acid reaction mixture which contains such a quantity of ammonium sulfate that the buffering action of the combination ammonium sulfate-ammonium hydrogen sulfate in the reaction mixture along with the hydroxyl ammonium-ammonium sulfate during the preparation of the oxime, results in a pH suitable for the preparation of the oxime, and whereupon, the oxime can be separated from the acid solution with the remaining solution containing free ammonium hydrogen sulfate being discharged. A major disadvantage associated with the recovery of ammonium hydrogen sulfate in this manner is that it contains dissolved ammonium sulfate. The ammonium hydrogen sulfate solution containing dissolved ammonium sulfate can be used in preparing fertilizer compositions by the decomposition of rock phosphate with nitric acid and removal of calcium in the form of gypsum. However, fertilizer compositions having $N-P_2O_5$ weight ratio of 1.5:1 or higher depending on the amount of ammonium sulfate present in the ammonium hydrogen sulfate solution. It is, however, desirable to produce fertilizer compositions having a lower $N-P_2O_5$ weight ratio such as 1:1.

The present invention provides a process for preparing an oxime wherein the acid solution which is separated from the oxime reaction product mixture can be used directly in processing rock phosphate with the aid of nitric acid to ultimately recover a mixed fertilizer composition having a N to $P_2O_5$ weight ratio of 1:1. In the process of the present invention, the formation of oxime from the acid solution containing hydroxylammonium-ammonium sulfate and ammonium hydrogen sulfate is controlled to take place in the presence of sufficient quantity of ammonium dihydrogen phosphate that, at the end of the oxime formation, the pH of the reaction mixture is at least 0.5, measured at a temperature of 25° C. At such a pH, the formation of oxime is 98 percent, and the conversion is even more complete at higher pH values.

To achieve a pH of at least 0.5 in the reaction product mixture at the end of the oxime formation, approximately one mole of $NH_4H_2PO_4$ must be added to the reaction mechanism for each mole of ammonium hydrogen sulfate which is present. The $NH_4H_2PO_4$ reacts with the ammonium hydrogen sulfate forming free phosphoric acid and ammonium sulfate.

The process of the present invention comprises the production of oximes by reacting a carbonyl containing compound and an aqueous solution of hydroxylammonium-ammonium sulfate and ammonium hydrogen sulfate obtained by converting a solution of ammonium nitrite and ammonium bisulfite to the ammonium salt of hydroxylamine disulfonic acid by reduction with $SO_2$, followed by hydrolysis of the ammonium salt to a solution of hydroxylammonium-ammonium sulfate and ammonium hydrogen sulfate. The oxime synthesis reaction of the present invention is accomplished in the presence of ammonium dihydrogen phosphate. The ammonium dihydrogen phosphate is added to the oxime synthesis feed in such quantity that the synthesis reaction product mixture has a pH, measured at 25° C, of at least 0.5. The oxime product is then separated from the remaining synthesis reaction mixture which comprises an aqueous solution containing phosphoric acid and ammonium sulfate.

The aqueous solution containing phosphoric acid and ammonium sulfate is then utilized directly in the processing of rock phosphate with the aid of nitric acid. The aqueous phosphoric acid and ammonium sulfate solution is added to the decomposition mass obtained from treating phosphate rock with nitric acid, whereupon gypsum is precipitated and an ammonium nitrate and free phosphoric acid solution can be separated therefrom. The phosphoric acid component is neutralized with ammonia forming ammonium dihydrogen phosphate. A portion of the ammonium dihydrogen phosphate-ammonium nitrate solution is recirculated to the oxime synthesis zone to supply the required amount of ammonium dihydrogen phosphate to the oxime synthesis reaction. The remaining ammonium dihydrogen phosphate-dihydrogen phosphate solution is concentrated by evaporation and granulated to form a mixed fertilizer having a N to $P_2O_5$ weight ratio of approximately 1:1.

The carbonyl compound used in the oxime synthesis can be an alicyclic ketone such as cyclohexanone, cyclopentanone, methycyclohexanone and cycloheptanone or aliphatic ketones having the formula

where R and $R^1$ are lower alkyl groups of from one to 10 carbon atoms.

The several process steps of the present invention can be accomplished at atmospheric, subatmospheric or superatmospheric pressures.

The reduction of ammonium nitrite and ammonium bisulfite with $SO_2$ can be accomplished at temperatures of from about $-7°$ C to about $+4°$ C. After the reduction with $SO_2$, sulfuric acid is added to the reaction mixture to give a solution pH of approximately 2 and subsequently the reaction mixture is heated to a temperature of from about $105°$ C to about $110°$ C to accomplish the hydrolysis of the hydroxylamine disulfonic ammonium salt to hydroxylammonium-ammonium sulfate and ammonium hydrogen sulfate. The oximation reaction can be conducted at temperatures from about $75°$ C to about $80°$ C. Temperatures of the solutions in the various steps of the decomposition of the rock phosphate and precipitation of gypsum from the decomposition mass are not critical.

The present invention will be more fully described with reference to the drawings and the following description of the preferred embodiments.

Figure 1:
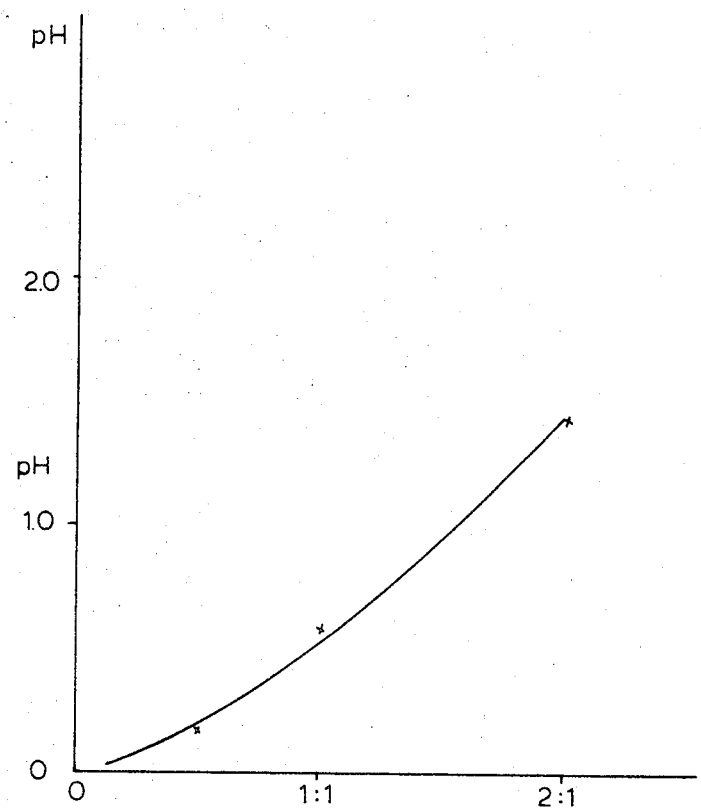
FIG. 1 is a graph showing the relation between the pH and molar ratio between the $NH_4H_2PO_4$ and $NH_4HSO_4$ in solutions containing about 55 percent by weight of water. The pH is plotted on the ordinate and the molar ratio of $NH_4H_2PO_4$ to $NH_4HSO_4$ on the abscissa.

As mentioned above, ammonium dihydrogen phosphate is added to the oxime reaction medium in sufficient amounts that the pH of the reaction product solution from the oximation step has a pH of at least 0.5 measured at a temperature of 25° C. The relationship between the ratio of $NH_4H_2PO_4$ and $NH_4HSO_4$ in solutions containing approximately 55 percent by weight water is shown in FIG. 1. As can be seen, an equal number moles of $NH_4H_2PO_4$ to moles of $NH_4HSO_4$ are required to produce a pH of 0.5. A molar excess of $NH_4H_2PO_4$ to $NH_4HSO_4$ produces a pH of in excess of 0.5 and thus can be effectively used in the present invention.

Figure 2:
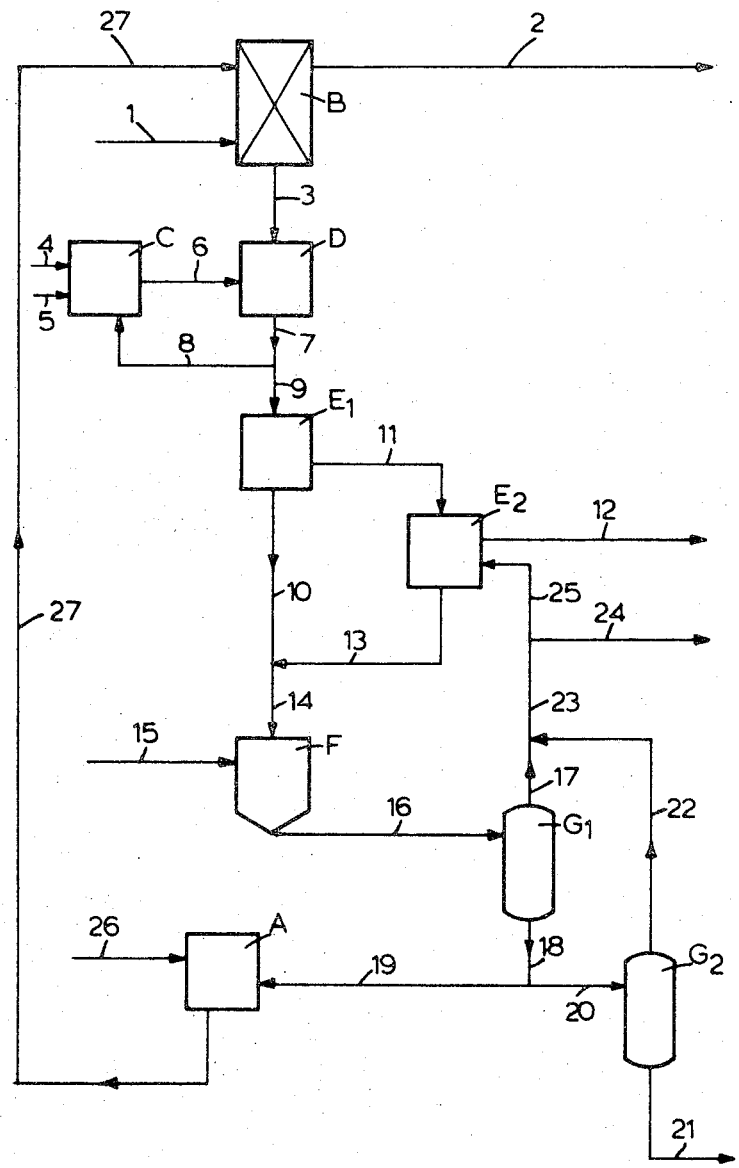
FIG. 2 is a schematic diagram of one preferred embodiment of the process of the present invention.

One preferred mode of performing the process according to the invention, in which the aqueous solution of phosphoric acid and ammonium sulfate from the oximation process is utilized in the treating of rock phosphate with the aid of nitric acid, is shown schematically in FIG. 2. Referring now to FIG. 2, an acid solution of hydroxylammonium-ammonium sulfate and ammonium hydrogen sulfate is fed to mixing vessel A through line 26. Ammonium dihydrogen phosphate is fed to mixing vessel A through line 19. The mixture formed in mixing vessel A is introduced to the oximation reactor B by line 27. In addition, the ketone being utilized is fed to reactor B through line 1.

The oxime formed in reactor B is discharged through line 2, while the solution containing phosphoric acid and ammonium sulfate and which has been freed of oxime is introduced to a gypsum precipitation vessel D by line 3. A decomposition liquid obtained by treating rock phosphate with nitric acid in reactor C, is supplied to vessel D through line 6. Rock phosphate and nitric acid are supplied to reactor C by lines 4 and 5 respectively.

A gypsum slurry in aqueous phosphoric acid is formed in vessel D. A portion of the gypsum slurry is recirculated by lines 7 and 8 to decomposition reactor C with the remainder of the gypsum slurry flowing through line 9 to separation section $E_1$ of a liquid-solid separating device such as a filter or decanter, where the gypsum component is separated from the phosphoric acid mother liquor. The mother liquor is fed to neutralization vessel F where it is reacted with $NH_3$ fed to vessel F through line 15. The ammonium dihydrogen phosphate formed by the reaction in vessel F is fed to evaporator $G_1$ through line 16 and concentrated in evaporator $G_1$. A portion of the concentrated ammonium dihydrogen phosphate solution from evaporator $G_1$ is recirculated to mixing vessel A through lines 18 and 19. The remainder of the ammonium dihydrogen phosphate solution from the evaporator $G_1$ is forwarded to evaporator $G_2$ where it is further evaporated to a melt of mixed fertilizer composition having an N to $P_2O_5$ weight ratio of approximately 1:1. This melt is granulated in a known manner. Alternatively, a potassium salt can be added to the melt prior to granulation.

The water vapor from evaporators $G_1$ and $G_2$ is removed in lines 17, 22, and 23. A portion of the water vapor is removed from the system through line 24. The remainder of the water vapor is condensed and forwarded to washing section $E_2$ of the liquid-solid separator wherein the gypsum from separating device $E_1$ is washed. The washed gypsum is discharged by line 12 and the wash water and dissolved mother liquor is added to the phosphoric acid mother liquor from separator $E_1$ by line 13.

The schematic diagram of FIG. 2 shows a preferred mode of performing the process of the present invention, however, the present invention is not limited thereto. The process shown in FIG. 2 can be modified in various ways within the scope of the present invention. For instance, mixing vessel A can be deleted in which case, the acid solution of hydroxylammonium-ammonium sulfate as well as the solution containing ammonium dihydrogen phosphate are introduced into the oximation reactor B. Further, the decomposition reactor C and the gypsum precipitation vessel D can be incorporated into one reactor in which the decomposition of rock phosphate and the precipitation of gypsum take place simultaneously. The use of two vessels wherein the rock phosphate is decomposed in the first and the gypsum precipitated in the second has the advantage of higher decomposition of rock phosphate efficiency as encapsulation of rock phosphate by precipitating gypsum is avoided.

The process shown in FIG. 2 can further be modified by crystallizing $NH_4H_2PO_4$ from the solution exiting from evaporator $G_1$ and recirculating the crystals of $NH_4H_2PO_4$ to mixing vessel A. This involves the added cost of a crystallizer, but on the other hand, process flows of a higher concentration are obtained.

EXAMPLE

Using the apparatus shown in FIG. 2, 100 moles of cyclohexanone was supplied to oximation reactor B through line 1, and 100 moles of hydroxylamine in the form of an acid solution of hydroxylammonium sulfate was fed to reactor B through lines 26 and 27. The oxime product comprising 100 moles of cyclohexanone oxime and 20 moles of water were withdrawn from the reactor B through line 2.

The decomposition reactor C was supplied through line 4 with rock phosphate containing 225 moles of CaO and 61 moles $P_2O_5$. An amount of 55 percent by weight solution of $HNO_3$ equivalent to 230 moles $HNO_3$ was added to reactor C through line 5. The slurry of decomposed rock phosphate was forwarded from reactor C to gypsum precipitator D. The mother liquor from the oximation reactor B containing 220 moles $H_3PO_4$, 457 moles $NH_4NO_3$, 225 moles $(NH_4)_2SO_4$ and 2,580 moles of water was added to the decomposed rock phosphate slurry in precipitator D.

A slurry containing 342 moles $H_3PO_4$, 1,925 moles $NH_4NO_3$, 617 moles $NH_4H_2PO_4$, 631 moles $CaSO_4$ and 9,194 moles of water was discharged from precipitator D of which a portion comprising 220 moles $H_3PO_4$, 1,238 moles $NH_4NO_3$, 397 moles $NH_4H_2PO_4$, 406 moles $CaSO_4$ and 5,914 moles of water was recirculated to the decomposition reactor C to process further rock phosphate. The remaining solution from precipitator D comprising 122 moles $H_3PO_4$, 687 moles $NH_4NO_3$, 220 moles $NH_4H_2PO_4$, 225 moles $CaSO_4$ and 3,280 moles of water was introduced to separator $E_1$ by line 9. The gypsum component comprising 22 moles $H_3PO_4$, 124 moles $NH_4NO_3$, 40 moles $NH_4H_2PO_4$, 225 moles $CaSO_4$ and 1,170 moles of water was separated from the mother liquor and discharged through line 11 to washing apparatus $E_2$. The mother liquor from separator $E_1$ comprising 100 moles $H_3PO_4$, 563 moles $NH_4NO_3$, 180 moles $NH_4H_2PO_4$ and 2,320 moles of water was forwarded by line 10 and 14 to neutralization vessel F. Wash water from washing apparatus $E_2$ comprising 22 moles $H_3PO_4$, 124 moles $NH_4NO_3$, 40 moles $NH_4H_2PO_4$ and 1,500 moles of water was added to the mother liquor fed to neutralizer F through line 13. Ammonia in an amount of 122 moles was added to neutralizer F by line 15.

The solution discharged from the neutralization reactor F contained 687 moles $NH_4NO_3$, 342 moles $NH_4H_2PO_4$, and 3,820 moles of water was forwarded through line 16 to evaporator $G_1$. The solution was concentrated in evaporator $G_1$, with 1,800 moles of water vapor removed through line 17. The concentrated solution comprising 687 moles $NH_4NO_3$, 342 moles $NH_4H_2PO_4$ and 2,020 moles of water was withdrawn from evaporator $G_1$ through line 18. A portion of this concentrated solution comprising 442 moles $NH_4NO_3$, 220 moles $NH_4H_2PO_4$ and 1,300 moles of water was forwarded to mixing vessel A to be used in processing further ketone to oxime. The remaining portion comprising 245 moles $NH_4NO_3$, 122 moles $NH_4H_2PO_4$ and 720 moles of water was forwarded by line 20 to evaporator $G_2$. This solution was evaporated and 702 moles of water vapor removed through line 22. The concentrated solution comprising 245 moles $NH_4NO_3$, 122 moles $NH_4H_2PO_4$ and 18 moles of water was discharged from evaporator $G_2$ through line 21. The composition discharged from evaporator $G_2$ was granulated into a solid fertilizer composition having 25 percent by weight N and 25 percent by weight $P_2O_5$.

The water vapor from evaporators $G_1$ and $G_2$ amounting to 3,204 moles of water was condensed, of which 1,710 moles was recirculated to apparatus $E_2$ to be used in washing the gypsum precipitate. The remaining water amounting to 792 moles was discharged from the system through line 24.

The crystallization temperature of the composition withdrawn from evaporator $G_1$ was 120° C and the crystallization temperature of the feed composition to reactor B was 70° C.

What is claimed is:

1. A process for the preparation of oximes by reaction of a carbonyl compound and an aqueous solution of hydroxylammonium sulfate and ammonium hydrogen sulfate, said process being characterized in that the oxime-forming reaction takes place in the presence of ammonium dihydrogen phosphate in such a quantity that the pH of the reaction mixture at the end of the oxime formation is at least 0.5, measured at 25° C, whereupon the oxime product is separated from the aqueous phase reaction mixture which contains phosphoric acid and ammonium sulfate, adding said phosphoric acid and ammonium sulfate to the decomposition product obtained from treating rock phosphate with nitric acid, whereupon a suspension of gypsum, ammonium nitrate and free phosphoric acid is produced, said gypsum is removed from the ammonium nitrate-phosphoric acid solution and the phosphoric acid content thereof neutralized with ammonia to ammonium dihydrogen phosphate, a portion of said ammonium dihydrogen phosphate is recirculated to the oximation zone, with the remaining portion of the ammoniated solution being concentrated by evaporation and granulated to a mixed fertilizer composition having an N-$P_2O_5$ weight ratio of approximately 1:1.

2. A process as claimed in claim 1 wherein the ammonium dihydrogen phosphate is present in a molar amount at least equivalent to the amount of ammonium hydrogen sulfate.

3. A process according to claim 1, characterized in that solid ammonium dihydrogen phosphate is crystallized from the solution containing ammonium nitrate and ammonium dihydrogen phosphate and the quantity of crystals formed is recirculated to the oximation zone.

4. A process according to claim 1 wherein a portion of the ammoniated solution is recirculated to the oximation zone.

* * * * *